March 6, 1928.
H. PIEPER
BRAKE DEVICE
Filed June 5, 1926
1,661,625
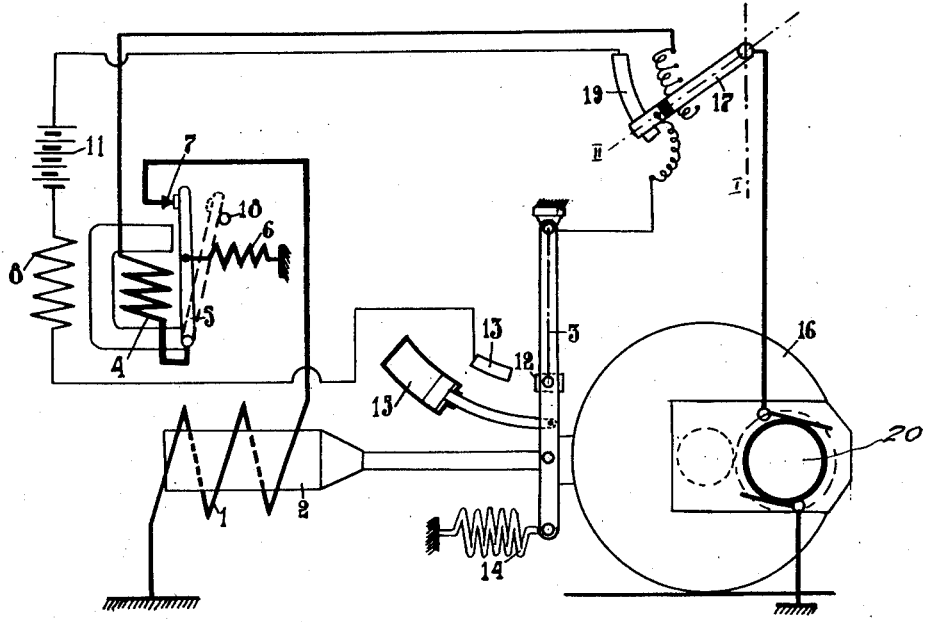
Inventor:
Henri Pieper
By
Attorney Patented Mar. 6, 1928.

1,661,625

UNITED STATES PATENT OFFICE.

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM.

BRAKE DEVICE.

Application filed June 5, 1926, Serial No. 113,944, and in Germany November 7, 1925.

The present invention relates to a brake device in which the current from a dynamo actuated by the axles or from the electric motors acting as generators is employed for braking the vehicle, and the object of the invention is to improve the method of braking obtained by means of such a device.

In braking a vehicle by means of the electric current produced in the manner indicated the danger exists, particularly upon a gradient but also on the level, that beyond a certain speed of the vehicle, which decreases as a result of the application of the brakes, the wheels become jammed or locked and stop in such a way that the vehicle then slides along the rails. When the wheels are locked the electric braking action ceases and the wheels commence to move again. But as soon as they start moving again the dynamo or the electric motors operate again as generators and recommence to brake the vehicle, the effect of which is then in certain cases to prevent the wheels from taking up again their normal speed. If at this moment the vehicle is upon a gradient it may take up a speed so great that it can no longer be braked effectively, and an accident may result therefrom.

In order to obviate this serious disadvantage in these brake devices employing electric current for producing the braking action and for ensuring that an efficient braking action will be produced under all circumstances, according to the invention the electric current obtained in the manner mentioned above is cut off automatically as soon as the wheels commence to skid and it is re-established automatically as soon as the wheels have again acquired a speed corresponding to the speed of the vehicle at that moment. By thus releasing the brake as soon as the wheels commence to skid upon the rails, and by waiting until the wheels again acquire during this release the speed of the vehicle, the braking action will only be re-established when the wheels cease to skid and consequently when the coefficient of friction of the wheels upon the rails has again reached the value it previously possessed.

In order to embody this braking principle in practice, means may be provided which depend in their operation upon the electric current producing the braking action and cut off this current at the moment it descends below a certain value as a result of a drop in the speed of the axles and which again close the circuit after a predetermined time; this time may be given for example by a movement of predetermined length of a member of the brake device when release takes place.

For this purpose use may be made, for example, of an electrical relay with two windings one of which is traversed by the current producing the braking action, or by a part of this current, and which cuts off this current, and thus its excitation also when it descends below a given value, while the other winding which serves for closing this circuit is supplied by a battery or other source of current through two switches one of which is closed by the lever of the controller moved into the braking position, the other switch being closed by a member or the brake mechanism after a certain movement for release has taken place and reopened again during the new application of the brake produced when the circuit of the braking current is again closed.

In order to be able to regulate and vary the time of the short period of release, the magnitude of which depends upon the speed of the vehicle, an adjustable shock absorber may be provided to act upon the member of the brake mechanism which causes the circuit of the braking current to be closed again.

The single figure of the accompanying drawing shows the invention applied to a brake system employing a solenoid for moving the brake mechanism and equipped with the two windings.

The circuit of the solenoid 1 which serves for displacing the core 2 and thus the brake mechanism 3 so as to apply the brake upon the wheel 16 is led through a contact stud 7 engageable by the armature 5 of the winding 4 of a relay and through the control lever 17 and then passes to the electric motors 20 normally actuating the vehicle and working as generators in the event of a braking action taking place and then supplying current to the solenoid 2 and to the winding 4, both of which are connected in series.

The armature 5 is also acted upon by a return spring 6 which draws it back towards a rest stop 18.

The relay, in addition to the winding 4, is provided with a second winding 8 the circuit of which has included in it a battery 11. One terminal of this circuit is connected to a contact sector 19 associated with the controller lever 17; the free end of the lever 17, which is insulated from the remainder of the lever, as shown, being connected to a contact stud 12 mounted upon the lever 3 of the brake mechanism. The contact stud 12 comes into contact with a contact sector 13 connected to the other terminal of the circuit when the lever 3 makes a movement for release under the action of the return spring 14. These two pairs of contacts 19—17, and 12—13 constitute the two switches previously mentioned. The dashpot 15 serves to regulate this movement of the lever 3.

The operation of the device is as follows:—

When it is desired to brake the vehicle the lever 17 of the controller is turned from the position I into the position II so that the current produced by the motors 20 working as generators can pass through the winding 4 which attracts armature 5 into engagement with contact 7 so that the circuit through said contact is closed and current can reach the solenoid 1 which produces the braking action by displacing the lever 3 towards the wheel 16.

If, for example upon a gradient, the braking current falls below a certain value as a result of the fall in speed of the axles, so that there is a danger of the wheels skidding upon the rails or upon the road, the winding 4 allows the armature 5 to be pulled back by spring 6 into the position shown in dotted lines and thus cuts off the current of the braking solenoid 2 at the contact 7. This breaking of the circuit cannot be prevented by the winding 8 because the circuit of the said winding 8 is opened by the separation of the switch or contact parts 12 and 13.

The spring 14 can now release the wheels which then take up again their normal speed. After a certain return movement of the lever 3 has taken place, controlled by the dashpot 15, the contact 12 touches the sector 13 and thereby closes the circuit of the winding 8 which also passes through the contact sector 19 of the controller 17. The excited winding 8 attracts armature 5 and, in consequence recloses the circuit through contact 7 in such a way that the solenoid 1 can again receive the current and produce the braking action, the winding 4 keeping this circuit 7 closed as the result of the increase in its excitation produced by the axles taking up again their normal speed, while the circuit of the coil 8 will be broken by the fresh braking movement of the lever 3 towards the wheel 16.

As the wheels turn again at a speed corresponding to the speed of the vehicle, the new braking action is efficient and the danger of the wheels skidding is avoided.

If the braking current falls again below the predetermined value the operation of the relay is repeated, producing once more a short period of release and then a new braking action, the sliding of the wheels upon the rails of the road always being prevented.

It is obvious that the invention may also be carried out in detail in a different manner from the forms shown in the drawings. For example in order to make use of the movement of release of any member of the brake system with a view to producing the reclosure of circuit of the braking current which is broken as a consequence of its fall below a certain value, use may be made, instead of a relay or a diaphragm, of other means, for example purely mechanical means. Also, for controlling this movement, instead of making provision for a dashpot or a needle valve, any other apparatus adapted to serve this purpose may be employed.

What I claim is:

1. A brake device for vehicles, in which the current from a dynamo actuated by the axles, or the current from the motors of the vehicle acting as generators, is employed for the braking of the vehicle, comprising means for cutting off said current automatically when the wheels slide upon the rails, and means for automatically reestablishing said current as soon as the wheels have again acquired the speed corresponding to the speed of the vehicle at the moment when the current shut-off occurred.

2. A brake device for vehicles, in which the current from a dynamo actuated by the axles, or the current from the motors of the vehicle acting as generators, is employed for the braking of the vehicle, comprising an electrical relay embodying a winding traversed by the current producing the braking in such a way that the relay cuts off this current when it falls below a predetermined value, and means acting on said relay for automatically reestablishing said current as soon as the wheels have again acquired the speed corresponding to the speed of the vehicle at the moment when the current shut-off occurred.

3. A brake device for vehicles, in which the current from a dynamo actuated by the axles, or the current from the motors of the vehicle acting as generators, is employed for the braking of the vehicle, comprising means for cutting off said current automatically when the wheels slide upon the rails, a member for reestablishing the braking current, and a winding supplied by a source of current and acting upon said member, said winding being included in a circuit comprising two switches, one of which is closed by the movement of the controller lever into braking position and the other being closed by a member of the brake mechanism after a certain interval during which said mechanism effects a certain releasing stroke.

4. A brake device for vehicles, in which the current from a dynamo actuated by the axles, or the current from the motors of the vehicle acting as generators, is employed for the braking of the vehicle, comprising an electrical relay embodying a winding traversed by the current producing the braking in such a way that said relay cuts off this current when it falls below a predetermined value, a member for reestablishing the braking current, and a second winding comprised in said relay supplied by a source of current and acting upon said member, the second winding being included in a circuit comprising two switches, one of which is closed by the movement of the controller lever into braking position and the other being closed by a member of the brake mechanism after a certain interval during which said mechanism effects a certain releasing stroke.

5. A brake device for vehicles, in which the current from a dynamo actuated by the axles, or the current from the motors of the vehicle acting as generators, is employed for the braking of the vehicle, comprising an electrical relay embodying a winding traversed by the current producing the braking in such a way that said relay cuts off this current when it falls below a predetermined value, a member for reestablishing the braking current, and a second winding comprised in said relay supplied by a source of current and acting upon said member, the second winding being included in a circuit comprising two switches, one of which is closed by the movement of the controller lever into braking position and the other being closed by a member of the brake mechanism after a certain interval during which said mechanism effects a certain releasing stroke, said brake-mechanism member being connected to the electro-magnet of an electro-magnetic brake brought into operation by said current and closing the circuit of the second winding under the action of a return spring.

6. A brake device for vehicles, in which the current from a dynamo actuated by the axles, or the current from the motors of the vehicle acting as generators, is employed for the braking of the vehicle, comprising means for cutting off said current automatically when the wheels slide upon the rails, means for automatically reestablishing said current as soon as the wheels have again acquired the speed corresponding to the speed of the vehicle at the moment when the current shut-off occurred, and means for regulating the said reestablishing of the braking current.

In testimony whereof I affix my signature.

HENRI PIEPER.